US012535638B2

(12) United States Patent
Bhasker

(10) Patent No.: US 12,535,638 B2
(45) Date of Patent: Jan. 27, 2026

(54) MULTI-STEP WAVEGUIDE TAPERING TO COUPLE LIGHT FROM A LIGHT SOURCE TO A RIDGE WAVEGUIDE

(71) Applicant: Avago Technologies International Sales Pte. Limited, Singapore (SG)

(72) Inventor: Prashanth Bhasker, Macungie, PA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 364 days.

(21) Appl. No.: 18/096,514

(22) Filed: Jan. 12, 2023

(65) Prior Publication Data

US 2024/0241311 A1 Jul. 18, 2024

(51) Int. Cl.
*G02B 6/122* (2006.01)
*G02B 6/12* (2006.01)

(52) U.S. Cl.
CPC .. *G02B 6/1228* (2013.01); *G02B 2006/12097* (2013.01); *G02B 2006/12142* (2013.01)

(58) Field of Classification Search
CPC .................................................... G02B 6/1228
USPC ............................................... 385/14, 42, 43
See application file for complete search history.

(56) References Cited

U.S. PATENT DOCUMENTS 6,246,709 B1 * 6/2001 Oshiba .................... H01S 5/026 372/50.1
6,453,105 B1 * 9/2002 Johnson ................ H01S 5/0264 385/129
8,285,092 B2 * 10/2012 Deki ...................... G02B 6/305 385/28
9,952,456 B2 4/2018 Huang
10,429,582 B1 * 10/2019 Bian .................. G02B 6/12002
2004/0037497 A1 * 2/2004 Lee ........................ G02B 6/132 385/28
2006/0285797 A1 12/2006 Little
2010/0322560 A1 * 12/2010 Granestrand ........ G02B 6/1223 29/600
2013/0188910 A1 * 7/2013 Tokushima ............ G02B 6/268 264/1.25
2019/0025512 A1 1/2019 Chetrit et al.
2019/0131772 A1 5/2019 Caër et al.

(Continued)

FOREIGN PATENT DOCUMENTS

EP 2 544 319 A1 1/2013

OTHER PUBLICATIONS

Lamponi, “Hybrid III-V on silicon lasers for telecommunication applications,” Université Paris Sud, 2012.

(Continued)

*Primary Examiner* — Robert Tavlykaev
(74) *Attorney, Agent, or Firm* — Foley & Lardner LLP

(57) ABSTRACT

A waveguide for an optical modulator system includes multiple tapered portions, or regions, designed to couple a CMBH laser light source to a ridge modulator. Using a waveguide with different tapered portions, transmission efficiency between the CMBH light source and the ridge modulator is improved, thus allowing the optical modulator to be used in high-speed applications. Waveguide described herein may include tapered portions in which, along a single direction, include one portion that tapers to a reduced width while another portion tapers to an increased width.

16 Claims, 7 Drawing Sheets

(56) References Cited

U.S. PATENT DOCUMENTS

2023/0418091 A1 * 12/2023 Kelly .................. G02B 6/2766

OTHER PUBLICATIONS

Extended European Search Report on EP Appln. No. 23213418.9 dated May 6, 2024.

Johnson J E et al: "Monolithically integrated semiconductor optical amplifier and electroabsorption modulator with dual-waveguide spot-size converter input", IEEE Journal of Selected Topics in Quantum Electronics, IEEE, USA, vol. 6, No. 1, Jan. 1, 2000 (Jan. 1, 2000) , pp. 19-25.

* cited by examiner

334

| | Length | Width | Width |
|---|---|---|---|
| Taper 1 | 3 to 250 μm | Width changing from 10±7.5μm to 2±1.5 μm | Width changing from 5±4.5 μm to 10±9 μm |
| Taper 2 | 3 to 50 μm | 2±1.5 μm | Width changing from 10±9 μm to 15±12 μm |

| | Length | Width | Width |
|---|---|---|---|
| Taper 1 | 3 to 30 µm | Width changing from 100±70µm to 10±7.5µm | 5±4.5 µm |
| Taper 2 | 3 to 250 µm | Width changing from 10±7.5µm to 2±1.5 µm | Width changing from 5±4.5 µm to 10±9 µm |
| Taper 3 | 3 to 50 µm | 2±1.5 µm | Width changing from 10±9 µm to 15±12 µm |

MULTI-STEP WAVEGUIDE TAPERING TO COUPLE LIGHT FROM A LIGHT SOURCE TO A RIDGE WAVEGUIDE

TECHNICAL FIELD

The present description relates generally to optical modulators including, and more particularly, to tapered waveguides used to integrate CMBH (capped mesa buried heterostructure) waveguide laser source with ridge waveguide modulator.

BACKGROUND

The optical modulator modulates the continuous wave light from the integrated laser using an electrical signal. These modulated signals can be carried over an optical fiber, which has significantly less signal loss compared to conductors such as copper and allows longer distance signal transmission. Both laser and modulator can be designed using CMBH waveguide. CMBH laser can include current blocking regions on either side of active multi-quantum well (MQW) to minimize current leakage. However, the blocking region adds additional capacitance, which may prevent the integrated optical modulator with CMBH waveguide from used at high frequencies.

BRIEF DESCRIPTION OF THE DRAWINGS

Certain features of the subject technology are set forth in the appended claims. However, for purposes of explanation, several aspects of the subject technology are depicted in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced using one or more implementations. In one or more instances, structures and components are shown in block-diagram form in order to avoid obscuring the concepts of the subject technology.

According to some aspects, the subject technology is directed to a multi-step waveguide taper to couple light from a light source to a modulator. The light source may include a laser light source, such as a distributed feedback (DFB) laser using CMBH waveguide, and the modulator may include a ridge waveguide optical modulator. Additionally, to couple light from the laser to the modulator, tapered waveguide design may be included with relatively high misalignment tolerance.

In some exemplary embodiments, the tapered waveguide of the subject technology includes a core and a clad that are configured to create a multistep-tapered waveguide. The disclosed tapered waveguide may include a multistep-tapered waveguide, such as a two-step tapered waveguide or a three-step tapered waveguide, as discussed in more details herein. The multistep-tapered waveguide of the subject technology is a substantially low-loss (e.g., 0.1 milliwatts (mw) to 0.2 mw from a 1 mw source) waveguide that can couple the CMBH waveguide to the ridge waveguide with a high efficiency (e.g., within a range of 80% to 90%). This is due in part to the disclosed multi-step tapered waveguide using a short taper length as compared to the existing single-taper waveguides with a length of several hundred microns. The shorter taper of the multi-step tapered waveguide of the subject technology also helps to reduce the overall chip dimensions, which reduces manufacturing cost and provide more space in a device for other components.

Figure 1:
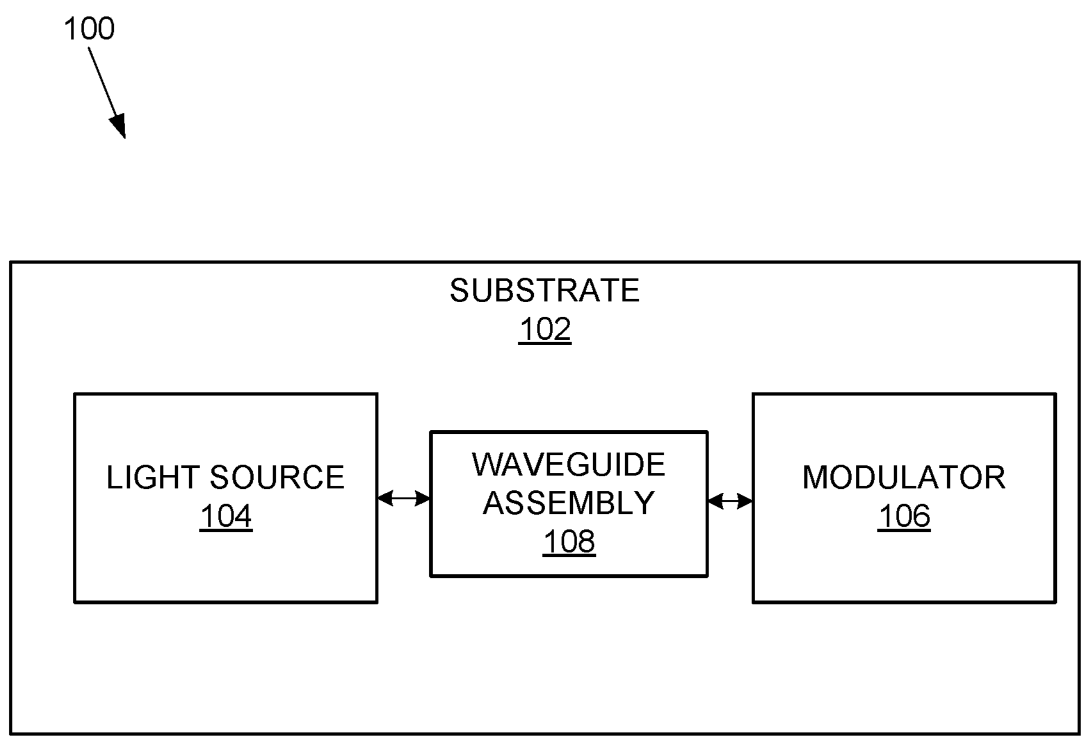
FIG. 1 illustrates a high-level diagram illustrating an example of an optical system using a multi-step tapered waveguide, according to aspects of the subject technology.

FIG. 1 illustrates a high-level diagram illustrating an example of an optical system 100 using a multi-step tapered waveguide, according to aspects of the subject technology. The optical system 100 can be integrated with optical communication system that use optical fiber transmission. The optical system 100 includes, but is not limited to, a substrate 102 as well as a light source 104 and a modulator 106 positioned on the substrate 102. The light source 104 may include a laser light source, or simply laser, including a CMBH laser light source or a CMBH-DFB laser light source. The modulator 106 is designed to modulate electrical signals (e.g., information, data packets) into light, e.g., light from the light source 104, allowing the information to be carried by light generated from the light source 104 through an optical fiber. The modulator 106 may include a ridge waveguide. In order to efficiently couple the light source 104 to the modulator 106, a waveguide 108, or waveguide assembly, is used. As shown, the waveguide 108 is positioned on the substrate 102. The waveguide 108 may be integrated with, and be part of, an isolation section (not shown in FIG. 1) between the light source 104 and the modulator 106. The isolation section is used to prevent parasitic electrical conduction between the light source 104 and the modulator 106.

In some embodiments, the waveguide 108 is a multi-step tapered waveguide, composed of one or more waveguide sections that efficiently couple the light emitted from the lights source 104 to the modulator 106. The waveguide 108 may include a CMBH waveguide portion integrated with the light source 104 and a ridge waveguide portion integrated with the modulator 106 to form a ridge waveguide modulator. Accordingly, light generated by the light source 104 is directed, by the waveguide 108, through the waveguide 108 and then through the modulator 106. Beneficially, the modulator 106, when incorporating, for example, a ridge waveguide design, offers lower overall capacitance thus allowing the optical system 100 to operate at high speeds (e.g., within a range of about 50 GHz to 75 GHZ). Using the waveguide 108, the coupling of the CMBH light source 104 and the ridge modulator 106 can be achieved with a high misalignment tolerance within a range of about ±0.8 micrometers (μm). This results in allowing the light source 104 to use optimized current blocking layers for higher output power, about 2 decibels (dB) to 2.5 dB higher when compared to the existing solutions without affecting the speed of the modulator 106.

The waveguide 108 can be implemented using a two-step tapering or a three-step tapering, as discussed in more details herein to create a two-step tapered or a three-step tapered waveguide, respectively. In one or more implementations, the optical system 100 is implemented on an indium phosphide (InP) semiconductor chip along with other optical or electrical modules, not shown for simplicity. Accordingly, the substrate 102 may be part of an integrated circuit with memory and process circuitry used to control, for example, the light source 104 and the modulator 106.

Figure 2:
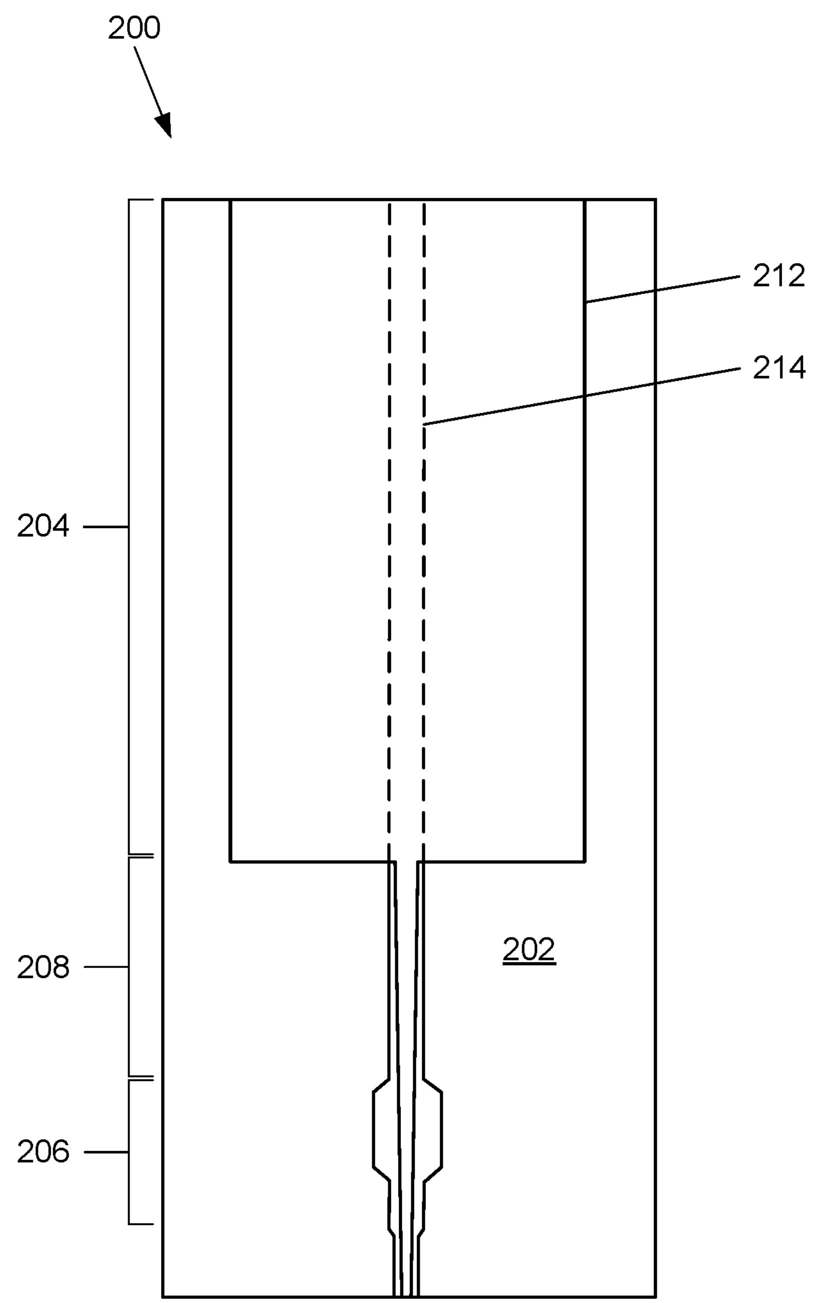
FIG. 2 illustrates a diagram illustrating an example layout of an optical system, according to aspects of the subject technology.

FIG. 2 illustrates an example layout of an optical system 200. The layout includes an aerial, two-dimension (2D) mask layout showing various components of the optical system 200, such as a substrate 202, a light source section 204 (or simply, light source), a waveguide 208, and a modulator section 206, which represent implementation of the light source 104, the waveguide 108, and the modulator 106 of FIG. 1, respectively. The mask layout is used to etch in an InP semiconductor. The light source section 204 includes a core 214 sandwiched by multiple layers of the clad 212. The clad 212 may include InP layers. The core 214 may include a MQW core used to direct light from the light source section 204 in a predetermined direction.

The waveguide 208 shows exemplary tapered section of the clad 212, with the tapered section transitioning from the light source section 204 to the modulator section 206. Additional features of waveguide tapering will be shown and described in more details herein.

Figure 3A:
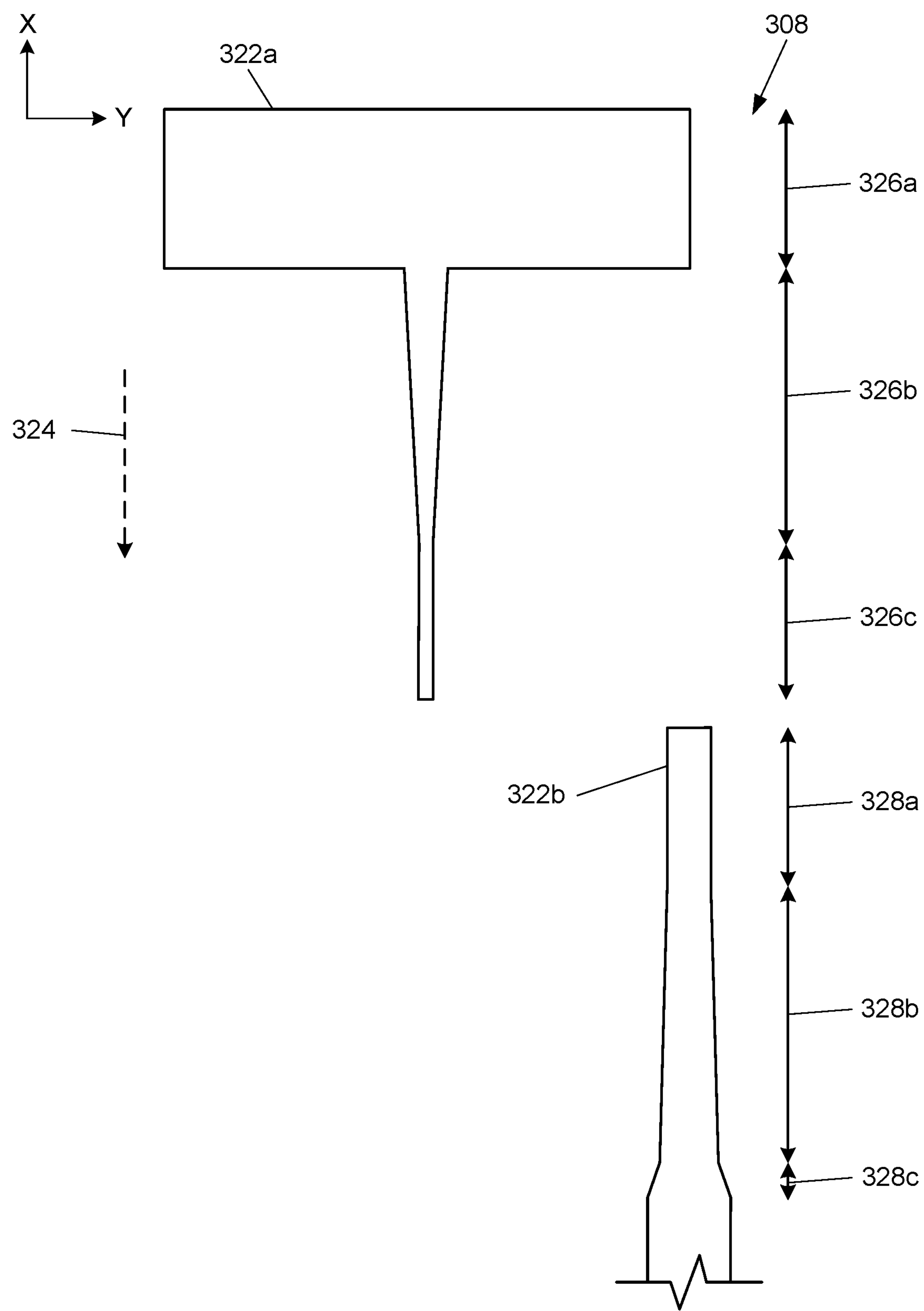
FIG. 3A illustrates waveguide portions of a two-step tapered waveguide, according to aspects of the subject technology.
Figures 3B, 3C:
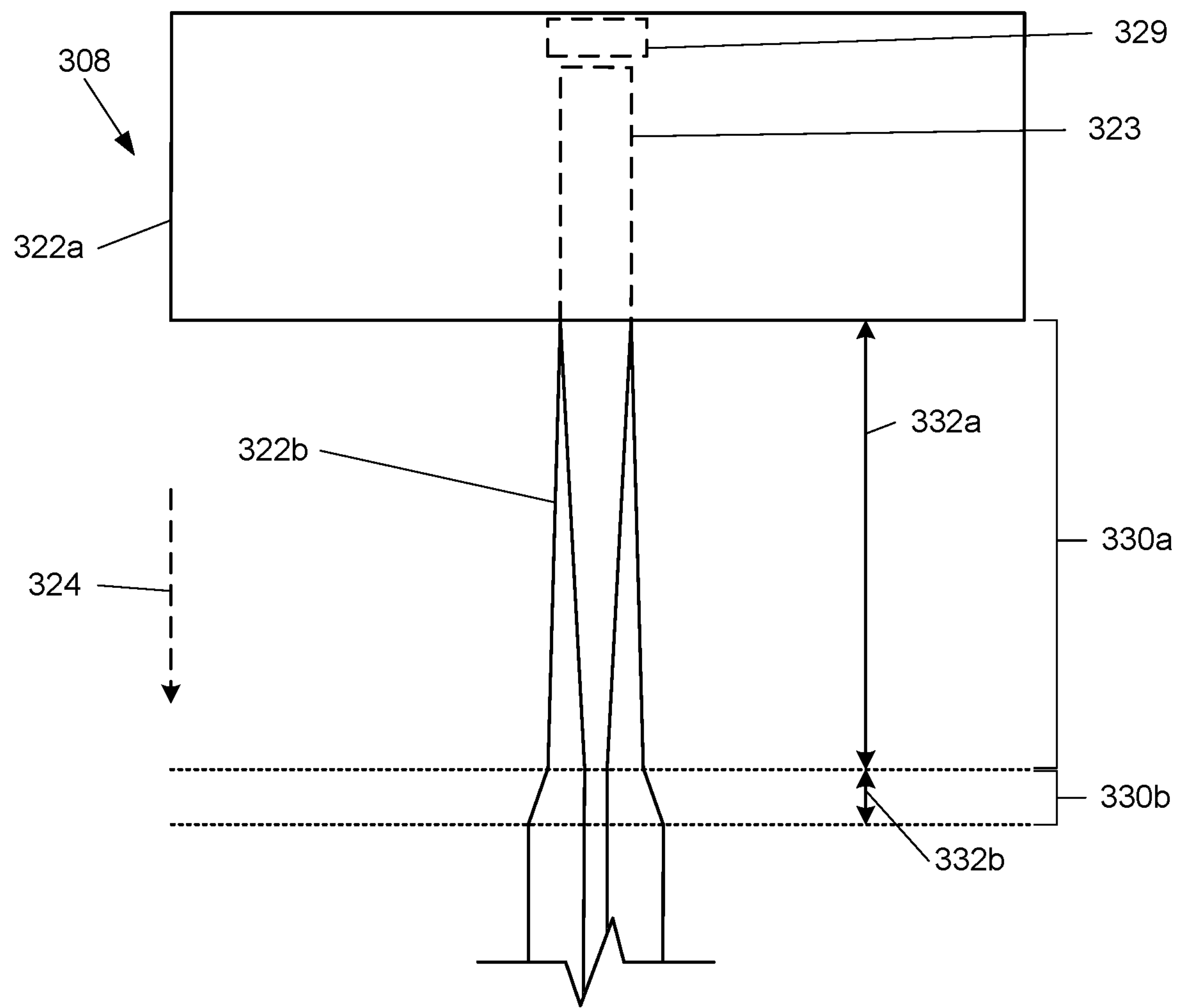
FIG. 3B illustrates waveguide portions of the two-step tapered waveguide integrated together, according to aspects of the subject technology.
FIG. 3C illustrates a table with respective widths of the waveguide shown in FIGS. 3A and 3B, according to aspects of the subject technology.

FIGS. 3A and 3B illustrate a waveguide 308, according to aspects of the subject technology. The waveguide 308 may form a single waveguide that includes a waveguide portion 322*a* and a waveguide portion 322*b* integrated together. The waveguide portion 322*a* may include a ridge waveguide portion and the waveguide portion 322*b* may include a CMBH laser waveguide portion. For purposes of illustration, the waveguide portions 322*a* and 322*b* are shown as separable components. However, as will be shown below, the waveguide portions 322*a* and 322*b* are integrated together at some regions.

As shown in FIG. 3A, each of the waveguide portions 322*a* and 322*b* may include a variance in width at different respective portions. For example, as measured along a direction 324 in the X-axis (of Cartesian coordinates). The direction 324 may represent a single direction (e.g., single axis direction) and a direction of light propagation through the waveguide 308, the waveguide portion 322*a* includes a width (measured along the Y-axis) that is constant at a location 326*a* of the waveguide portion 322*a*. However, at a location 326*b* of the waveguide portion 322*a*, the width of the waveguide portion 322*a* decreases along the direction 324. Further, at a location 326*c* of the waveguide portion 322*a*, the width of the waveguide portion 322*a* is again constant, but is less than the width of the waveguide portion 322*a* at the location 326*a*. Conversely, along the direction 324, the waveguide portion 322*b* includes a width (measured along the Y-axis) that is constant at a location 328*a* of the waveguide portion 322*b*. However, at a location 328*b* of the waveguide portion 322*b*, the width of the waveguide portion 322*a* increases along the direction 324. Further, at a location 328*c* of the waveguide portion 322*b*, the width of the waveguide portion 322*b* further increases.

FIG. 3B illustrates the waveguide portions 322*a* and 322*b* integrated together to form the waveguide 308. The term "integrated" refers to structures (e.g., waveguide portions 322*a* and 322*b*) connected or assembled, which may include one of the waveguide portions at least partially disposed with the other waveguide portion. For example, a sub-section 323 of the waveguide portion 322*b* is shown as having dotted lines. The sub-section 323 of the waveguide portion 322*b* is positioned within the waveguide portion 322*a*, and at the sub-section 323, the waveguide portion 322*b* includes a constant width. Although not shown, the waveguide portions 322*a* and 322*b* can be located on an integrated circuit.

The waveguide portion 322*a* may include one or more cladding layers, defined as clad, designed to confine light. Also, the waveguide portion 322*b* may include a core and is used as a modulator for modulating light from the light source 329. The waveguide 308 may represent a two-step tapered waveguide design, as discussed below.

Based on the change in the respective widths of the waveguide portions 322*a* and 322*b*, as discussed in FIG. 3A, for example, the waveguide 308 may include a section 330*a* and a section 330*b*, with the section 330*a* being closer to the light source 329 than the section 330*b*. At the section 330*a* of the waveguide 308, the width of the waveguide portion 322*a* is decreasing while the width of the waveguide portion 322*b* is increasing. In this regard, at the section 330*a* of the waveguide 308, the waveguide portion 322*a* includes a decreasing taper and the waveguide portion 322*b* includes an increasing taper. Accordingly, it can be seen that, at the section 330*a*, the waveguide portion 322*a* includes a decreasing width along the direction 324, while the waveguide portion 322*b* includes an increasing width along the direction 324. Also, at the section 330*a*, the width of the waveguide portion 322*b* becomes wider than that of the waveguide portion 322*a*. Conversely, it can be said that the waveguide portion 322*a* becomes narrower than that of the waveguide portion 322*b*. Based on the change in respective widths, each of the waveguide portions 322*a* and 322*b* may be referred to as a tapered waveguide portion, and the waveguide 308 may be referred to as a tapered waveguide.

Further, at the section 330*b* of the waveguide 308, the waveguide portion 322*b* includes an additional increasing taper. Put another way, at the section 330*b*, the width of the waveguide portion 322*b* becomes even greater than that at the section 330*a*. Also, at the section 330*b*, the width of the waveguide portion 322*a* is constant. Additionally, the section 330*a* and the section 330*b* of the waveguide 308 include a length 332*a* and a length 332*b*, respectively. The lengths 332*a* and 332*b* will be discussed below.

FIG. 3C illustrates a table 334 with respective widths of the waveguide 308 shown in FIGS. 3A and 3B. As shown in the table 334, Taper 1 (section 330*a* in FIG. 3B) may include a length (length 332*a* in FIG. 3B) within a range of about 3 μm to 250 μm. For Taper 2 (section 330*b* in FIG. 3A), the length (length 332*b* in FIG. 3B) is within a range of about 3 μm to 50 μm. Regarding the widths, the width of Taper 1 (corresponding to section 330*a* in FIG. 3B) of the waveguide portion 322*a* in FIG. 3B varies from a range of 10 μm±7.5 μm down to a range of about 2 μm±1.5 μm. Accordingly, at the section 330*a*, the decreased taper of the waveguide portion 322*a* can reduce from approximately 10 μm to 2 μm.

Conversely, the width of Taper 1 of the waveguide portion 322*b* in FIG. 3B varies from a range of 5 μm±4.5 μm up to a range of about 10 μm±9 μm. Accordingly, at the section 330*a*, the increased taper of the waveguide portion 322*b* can enlarge from approximately 5 μm to 10 μm.

The width of Taper 2 (corresponding to section 330*b* in FIG. 3B) of the waveguide portion 322*a* in FIG. 3B can remain at a constant width of 2 μm±1.5 μm. The width of Taper 2 of the waveguide portion 322*b* can further enlarge from 10 μm±9 μm to 15 μm±12 μm. Accordingly, the waveguide portion 322*b* can undergo two increased widths.

Several observable characteristics can be seen. For example, at least one of the waveguide portions 322*a* and 322*b* may be referred to as a tapered waveguide portion. Also, based on the respective dimensions, it can be seen that, at the section 330*a*, the waveguide portion 322*a* and the waveguide portion 322*b* may include equal widths.

Figure 4A:
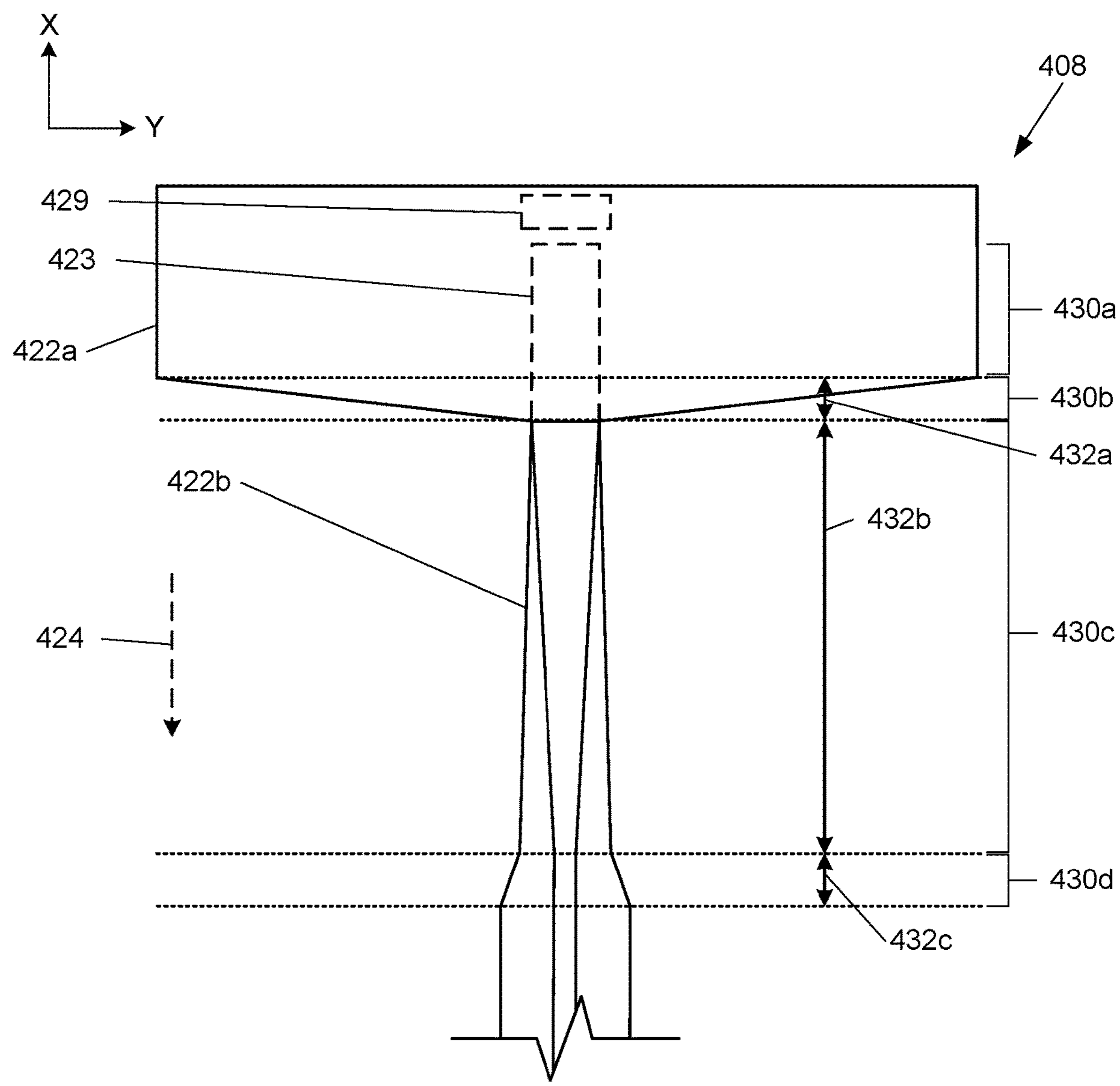
FIG. 4A illustrates a schematic diagram illustrating an example layout of a three-step tapered waveguide, according to aspects of the subject technology.

FIG. 4A illustrates a waveguide 408, according to aspects of the subject technology. The waveguide 408 may form a single waveguide that includes a waveguide portion 422*a* and a waveguide portion 422*b*. The waveguide portion 422*a* may include a ridge waveguide portion and the waveguide portion 422*b* may include a CMBH laser waveguide portion.

The waveguide portion 422*a* may include one or more cladding layers, defined as clad, designed to confine light. Also, the waveguide portion 422*b* may include a core and is used as a modulator for modulating light from the light source 429. The waveguide 408 may represent a three-step tapered waveguide design, as discussed below.

As shown, the waveguide portions 422*a* and 422*b* are integrated together at some regions. In this regard, a sub-section 423 of the waveguide portion 422*b* is shown as having dotted lines. The sub-section 423 of the waveguide portion 422*b* is positioned within the waveguide portion 422*a*.

Further, the waveguide 408 may include multiple sections. For example, the waveguide 408 includes a section 430*a* and a section 430*b*. The sections 430*a* and 430*b* each represent sections in which the waveguide portion 422*b* is positioned within the waveguide portion 422*a*. At the section 430*a* of the waveguide 408, the waveguide portion 422*b* is located within the waveguide portion 422*a*, and the respective widths of the waveguide portions 422*a* and 422*b* are generally constant, i.e., the widths do not change. However, at the section 430*b* of the waveguide 408, the waveguide portion 422*a* includes a decreasing taper, while the waveguide portion 422*b* does not include a taper, i.e., the waveguide portion 422*b* remains at a constant width. Put another way, the width (measured along the Y-axis) decreases in a direction 424, which represents a single direction (e.g., along the X-axis) and a direction of light (from a light source 429) propagated through the waveguide 408.

Further, at the section 430*c* of the waveguide 408, the waveguide portion 422*a* includes a decreasing taper and the waveguide portion 422*b* includes an increasing taper. Put another way, the width (measured along the Y-axis) of the waveguide portion 422*a* decreases along the direction 424, while the width (measured along the Y-axis) of the waveguide portion 422*b* increases along the direction 424. In this regard, at the section 430*c* of the waveguide 408, the width of the waveguide portion 422*b* becomes wider than that of the waveguide portion 422*a*. Conversely, it can be said that the waveguide portion 422*a* becomes narrower than the waveguide portion 422*b*.

Further, at the section 430*d* of the waveguide 408, the waveguide portion 422*b* includes an additional increasing taper. Put another way, at the section 430*d*, the width (measured along the Y-axis) of the waveguide portion 422*b* is even greater than that at the section 430*c*. Also, at the section 430*d*, the width (measured along the Y-axis) of the waveguide portion 422*a* is constant. Additionally, the section 430*b*, the section 430*c*, and the section 430*d* of the waveguide 408 include a length 432*a*, a length 432*b*, and a length 432*c*, respectively. The lengths 432*a*, 432*b*, and 432*c* will be discussed below.

Figure 4B:
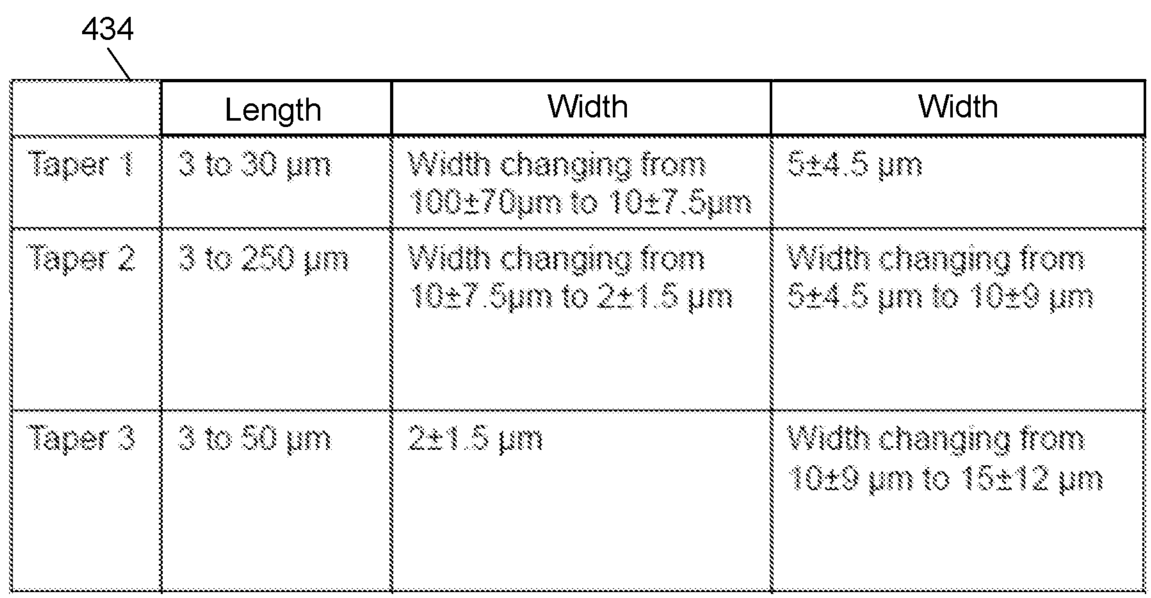
FIG. 4B illustrates a table with respective widths of the waveguide shown in FIG. 4A, according to aspects of the subject technology.

FIG. 4B illustrates a table 434 with respective widths of the waveguide 408 shown in FIG. 4A, As shown in the table 434, Taper 1 (section 430*b* in FIG. 4A) may include a length (length 432*a* in FIG. 4A) within a range of about 3 μm to 30 μm. For Taper 2 (section 430*c* in FIG. 4A), the length (length 432*b* in FIG. 4A) is within a range of about 3 μm to 250 μm. For Taper 3 (section 430*d* in FIG. 4A), the length (length 432*c* in FIG. 4A) is within a range of about 3 μm to 50 μm. Regarding the widths, the width of Taper 1 (corresponding to section 430*b* in FIG. 4A) of the waveguide portion 422*a* in FIG. 4A varies from a range of 100 μm±70 μm down to a range of about 10 μm±7.5 μm. Accordingly, at the section 430*ba*, the decreased taper of the waveguide portion 422*a* can reduce from approximately 100 μm to 10 μm. However, the width of Taper 1 of the waveguide portion 422*b* in FIG. 4A remains constant at 5 μm±4.5 μm.

The width of Taper 2 (corresponding to section 430*c* in FIG. 4A) of the waveguide portion 422*a* in FIG. 3A varies from a range of 10 μm±7.5 μm down to a range of about 2 μm±1.5 μm. Accordingly, at the section 430*c*, the decreased taper of the waveguide portion 422*a* can reduce from approximately 10 μm to 2 μm. Conversely, the width of Taper 2 of the waveguide portion 422*b* in FIG. 4A varies from a range of 5 μm±4.5 μm up to a range of about 10 μm±9 μm. Accordingly, at the section 430*c*, the increased taper of the waveguide portion 422*b* can enlarge from approximately 5 μm to 10 μm.

The width of Taper 3 (corresponding to section 430*d* in FIG. 4A) of the waveguide portion 422*a* in FIG. 4A can remain at a constant width of 2 μm±1.5 μm. The width of Taper 2 of the waveguide portion 422*b* can further enlarge from 10 μm±9 μm to 15 μm±12 μm. Accordingly, the waveguide portion 422*b* can undergo two increased widths.

Several observable characteristics can be seen. For example, each of the waveguide portions 422*a* and 422*b* may be referred to as a tapered waveguide portion. Also, based on the respective dimensions, it can be seen that, at the section 430*c*, prior to the decreasing tapering of the waveguide portion 422*a* and the increasing tapering of the waveguide portion 422*b*, the waveguide portion 422*a* and the waveguide portion 422*b* may include equal widths (measured along the Y-axis).

FIGS. 5A-5D illustrates cross-sectional views of a waveguide 508. FIG. 5A-5D show different "slices" of the waveguide 508, some of which may correspond to the waveguides 308 and 408 in FIGS. 3A and 4A, respectively. Also, the waveguide 508 includes a waveguide portion 522*a* and a waveguide portion 522*b*. The waveguide portion 522*a* is an example implementation of the waveguide portions 322*a* and 422*a* in FIGS. 3A and 4A, respectively. Similarly, the waveguide portion 522*b* is an example implementation of the waveguide portions 322*b* and 422*b* in FIGS. 3A and 4A, respectively.

Figure 5A:
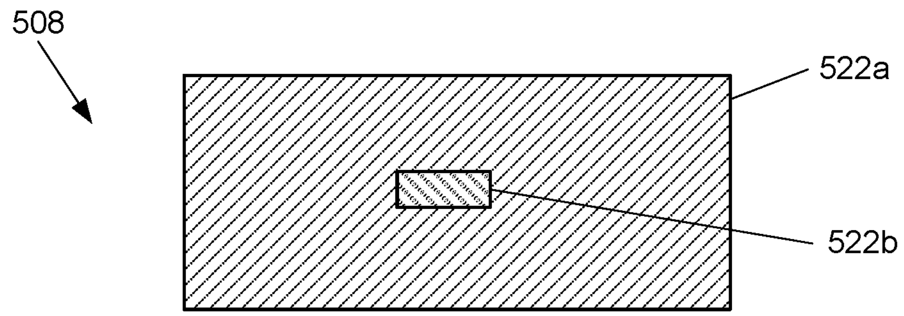
FIGS. 5A-5D illustrates cross-sectional views of a waveguide, according to aspects of the subject technology.

FIG. 5A shows a cross section view of the waveguide 508 showing the waveguide portion 522*a* surrounding the waveguide portion 522*b*. Put another way, the waveguide portion 522*b* is located within the waveguide portion 522*a*. It can be seen that the width of the waveguide portion 522*a* is greater than that of the waveguide portion 522*b*.

Figure 5B:
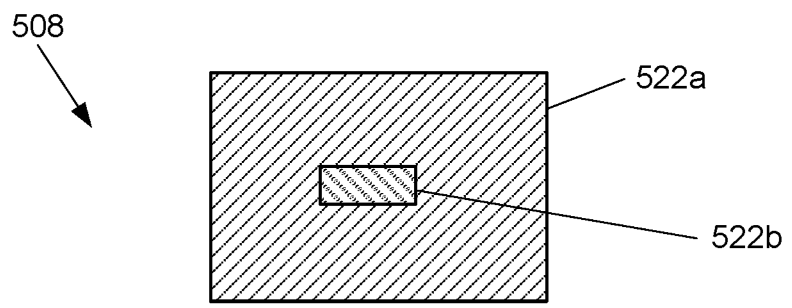

FIG. 5B shows a cross section view of the waveguide 508 showing the waveguide portion 522*a* still surrounding the waveguide portion 522*b*. However, the width of the waveguide portion 522*a* reduced. In this regard, the waveguide portion 522*a* is undergoing a decreased taper.

Figure 5C:
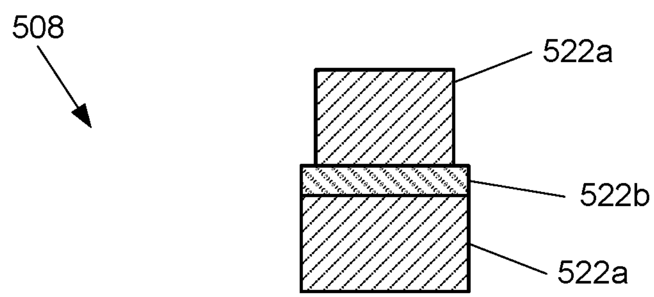

FIG. 5C shows a cross section view of the waveguide 508 showing the width of the waveguide portion 522*a* further reduced, while the width of the waveguide portion 522*b* is increased. As shown, the width of the waveguide portion 522*b* is greater than that of the waveguide portion 522*a*. Accordingly, at least some of the waveguide portion 522*b* is exposed, i.e., uncovered by the waveguide portion 522*a*. Due in part to the waveguide portion 522*b* being built into the waveguide portion 522*a*, the waveguide portion 522*a* is located both above and below the waveguide portion 522*b*.

Figure 5D:
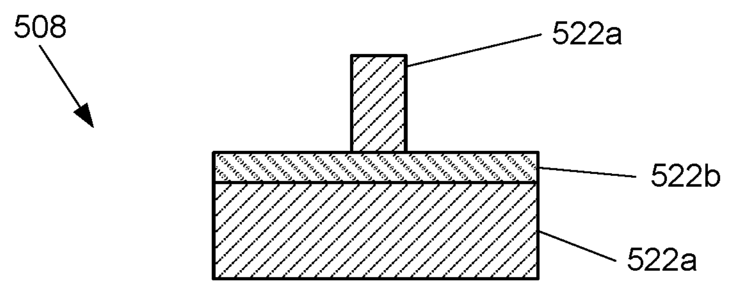

FIG. 5D shows a cross section view of the waveguide 508 showing the width of the waveguide portion 522*a* further reduced (indicating an additional decreased taper) in one location, while the width of the waveguide portion 522*b* is further increased. As shown, the width of the waveguide portion 522*b* is even greater than that of the waveguide portion 522*a*. Similar to the cross section shown in FIG. 5C, the waveguide portion 522*a* is located both above and below the waveguide portion 522*b*.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein but are to be accorded the full scope consistent with the language of the claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its), and vice versa. Headings and subheadings, if any, are used for convenience only, and do not limit the subject disclosure.

The predicate words "configured to", "operable to", and "programmed to" do not imply any particular tangible or intangible modification of a subject, but, rather, are intended to be used interchangeably. For example, a processor configured to monitor and control an operation, or a component may also mean the processor being programmed to monitor and control the operation or the processor being operable to monitor and control the operation. Likewise, a processor configured to execute code can be construed as a processor programmed to execute code or operable to execute code.

A phrase such as an "aspect" does not imply that such aspect is essential to the subject technology, or that such aspect applies to all configurations of the subject technology. A disclosure relating to an aspect may apply to all configurations, or one or more configurations. A phrase such as an "aspect" may refer to one or more aspects and vice versa. A phrase such as a "configuration" does not imply that such configuration is essential to the subject technology, or that such configuration applies to all configurations of the subject technology. A disclosure relating to a configuration may apply to all configurations, or one or more configurations. A phrase such as a "configuration" may refer to one or more configurations, and vice versa.

The word "example" is used herein to mean "serving as an example or illustration". Any aspect or design described herein as "example" is not necessarily to be construed as preferred or advantageous over other aspects or designs.

When an element is referred to herein as being "connected" or "coupled" to another element, it is to be understood that the elements can be directly connected to the other element, or have intervening elements present between the elements. In contrast, when an element is referred to as being "directly connected" or "directly coupled" to another element, it should be understood that no intervening elements are present in the "direct" connection between the elements. However, the existence of a direct connection does not exclude other connections, in which intervening elements may be present.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for". Furthermore, to the extent that the term "include", "have", or the like is used in the description or the claims, such term is intended to be inclusive in a manner similar to the term "comprise", as "comprise" is interpreted when employed as a transitional word in a claim.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way), all without departing from the scope of the subject technology.

What is claimed is:

1. An optical modulator, comprising:

a waveguide configured to couple light from a CMBH light source to a ridge modulator, the waveguide comprising:

a first section, a second section, and a third section that are consecutive along a direction of the light from the CMBH light source;

a first waveguide portion comprising a core; and a second waveguide portion comprising multiple layers of clad integrated with the first waveguide portion, wherein:

at the first section of the waveguide, the first waveguide portion comprises a first decreasing taper and the second waveguide portion comprises a first increasing taper, at the second section of the waveguide, the second waveguide portion comprises a second increasing taper different from the first increasing taper and the first waveguide portion comprises a second decreasing taper different from the first decreasing taper, at the third section, the first waveguide portion comprises a constant width until an end of the waveguide, and the first waveguide portion is positioned within the second waveguide portion.

2. The optical modulator of claim 1, wherein the first section is closer to the CMBH light source than the second section.

3. The optical modulator of claim 1, wherein along a single direction:

the first decreasing taper defines a decreasing width, the first increasing taper defines a first increasing width, and the second increasing taper defines a second increasing width.

4. The optical modulator of claim 1, wherein the second section is i) longer than the first section and ii) longer than the third section.

5. The optical modulator of claim 1, wherein:

the second waveguide portion comprises a sub-section positioned within the first waveguide portion, and the sub-section comprises a constant width.

6. The optical modulator of claim 1, wherein at the first section:

the first waveguide portion comprises a first width, and the second waveguide portion comprises a second width less than the first width.

7. The optical modulator of claim 1, wherein at the first section:

the first waveguide portion comprises a first width, and the second waveguide portion comprises a second width greater than the first width.

8. The optical modulator of claim 1, wherein at the second section:

the first waveguide portion comprises a first width, and the second waveguide portion comprises a second width equal to the first width.

9. The optical modulator of claim 1, wherein the first waveguide portion comprises a CMBH laser waveguide and the second waveguide portion comprises a ridge waveguide.

10. A waveguide for an optical modulator, the waveguide comprising:

a first section, a second section, and a third section that are consecutive along a direction of the waveguide;

a first waveguide portion comprising a core configured to modulate light from a laser light source of the optical modulator; and a second waveguide portion comprising multiple layers of clad integrated with the first waveguide portion, wherein the laser light source is integrated with the first waveguide portion and the first waveguide portion is positioned within the second waveguide portion, wherein:

at the second section of the waveguide, the second waveguide portion comprises a first increasing taper and the first waveguide portion comprises a first decreasing taper, and at the third section, the first waveguide portion comprises a constant width until an end of the waveguide.

11. The waveguide of claim 10, wherein:

at the first section, the first waveguide portion comprises a second decreasing taper different from the first decreasing taper and the second waveguide portion comprises a second increasing taper different from the first increasing taper.

12. The waveguide of claim 11, wherein at the third section, the second waveguide portion comprises a third increasing taper different from the first increasing taper.

13. An integrated circuit, comprising:

a laser light source; and a tapered waveguide comprising:

a modulator configured to modulate light from the laser light source;

an isolation section configured to guide the light, wherein the isolation section is positioned within the modulator; and a first section, a second section, and a third section that are consecutive along a direction of the light from the laser light source, wherein:

at the second section of the tapered waveguide, a second waveguide portion comprises an increasing taper and a first waveguide portion comprises a decreasing taper, the first waveguide portion is positioned within the second waveguide portion, and at the third section, the first waveguide portion comprises a constant width until an end of the tapered waveguide.

14. The integrated circuit of claim 13, wherein:

the tapered waveguide includes the first waveguide portion and the second waveguide portion, the laser light source is integrated with the first waveguide portion, and the modulator is integrated with the second waveguide portion.

15. The integrated circuit of claim 14, wherein:

the first waveguide portion comprises a first tapered waveguide portion, and the second waveguide portion a second tapered waveguide portion.

16. The integrated circuit of claim 14, wherein:

at the first section, the first waveguide portion is wider than the second waveguide portion, and at the second section, the first waveguide portion is narrower than the second waveguide portion.

* * * * *